July 14, 1925.
E. H. FREEMAN
1,545,752
RATIO INDICATING MECHANISM
Filed Jan. 28, 1922
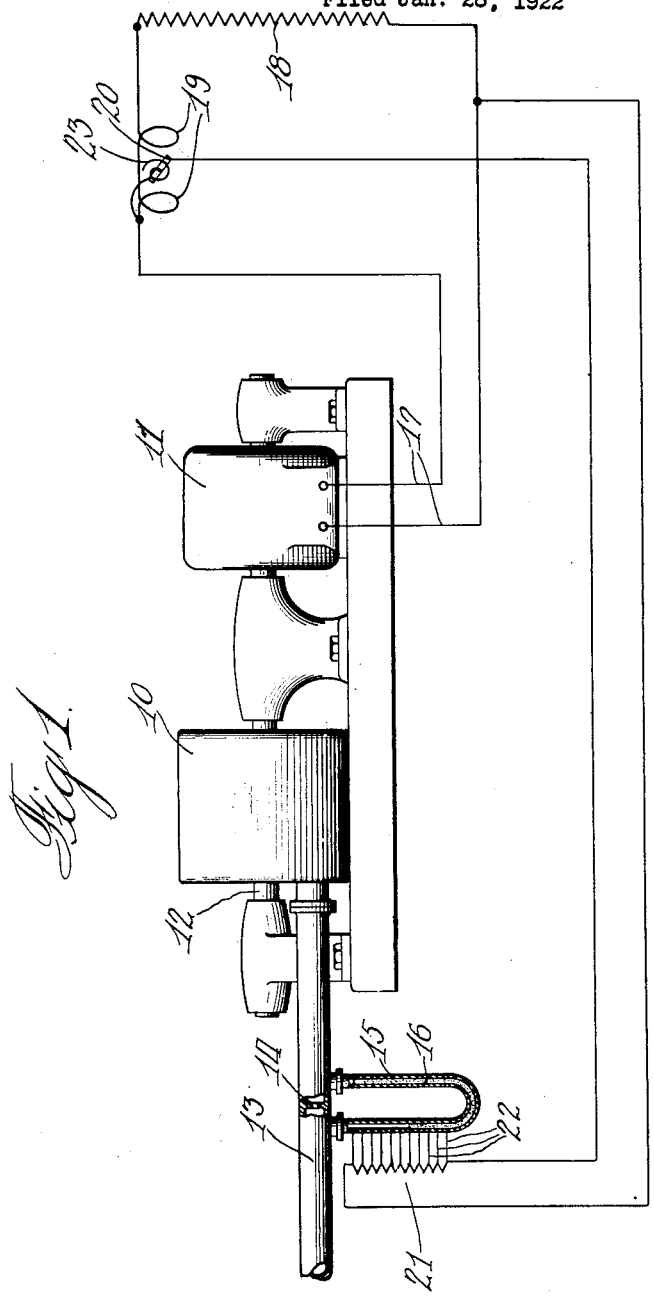
Witness:
Dave S. Magnusson.
Inventor:
Ernest H. Freeman
By Nissen & Crane Attys.

Patented July 14, 1925.

1,545,752

UNITED STATES PATENT OFFICE.

ERNEST H. FREEMAN, OF WILMETTE, ILLINOIS.

RATIO-INDICATING MECHANISM.

Application filed January 28, 1922. Serial No. 532,480.

*To all whom it may concern:*

Be it known that I, ERNEST H. FREEMAN, a citizen of the United States, residing at Wilmette, in the county of Cook and State of Illinois, have invented certain new and useful Improvements in Ratio-Indicating Mechanism, of which the following is a specification.

This invention relates to mechanism for indicating the ratio between two factors, such as the input and output of a power unit, and has for its object the provision of improved mechanism of the class named which shall indicate the desired ratio without the necessity of mathematical calculations.

The invention is exemplified in the combination and arrangement of parts shown in the accompanying drawing and described in the following specification, and is more particularly pointed out in the appended claims.

In the drawing—

The figure is a somewhat diagrammatic representation of an electric generator and its driving unit equipped with one embodiment of the present invention.

A steam turbine or other prime mover 10 is represented as driving an electric generator 11, the two being connected by a common shaft 12. Motive fluid, such as steam, is supplied through the pipe 13 to the turbine 10. The pipe 13 is provided with a restricted orifice 14 on opposite sides of which the two ends of a U-tube 15 are connected to the pipe. In the U-tube 15 is a column of mercury 16, the ends of which are subjected to the differential pressure at opposite sides of the orifice 14. It will be apparent that the surface levels of the mercury in the U-tube will vary according to the rate of flow of fluid through the pipe 13. A Pitot tube or other flow-indicating device may, of course, be substituted for the orifice 14.

The current produced by the generator 11 passes through conductors 17 and load 18 which may be either inductive or non-inductive. In series with the load 18 are the fixed coils 19 of an electro-dynamometer. The movable coil 20 of the dynamometer is connected with the terminals of the generator 11 and in series with a non-inductive resistance 21. The resistance 21 is connected to the U-tube 15 by jumpers 22 so that varying amounts of the resistance 21 are short circuited by the mercury column 16, the arrangement being such that the resistance increases with an increased flow of fluid through the pipe 13. The movable coil 20 of the electro-dynamometer is held in its zero position by a spring 23, although it will be apparent that gravity or other means may be employed for restoring the needle of the electro-dynamometer to its initial position.

When current is flowing from the generator 11 the movable coil of the dynamometer is subjected to a torque $T_d$ which is proportional to the product of the current $I_m$ flowing in the movable coil, times the current $I$ flowing in the fixed coils, multiplied by the power factor $\cos \theta$ of the load. This may be expressed as follows:

$$T_d \propto I_m \cdot I \cos \theta \quad (1)$$

If $T_r$ is the restoring torque exerted by a spring control for the movable coil then $$T_r \propto \delta \quad (2)$$

where $\delta$ is the angle of deflection of the movable coil. When the coil comes to rest at some deflected position $$T_d = T_r \quad (3)$$

whence $$\delta \propto I_m \cdot I \cos \theta \quad (4)$$

But for the conditions given, $$I_m = \frac{E}{r} \quad (5)$$

in which E is the terminal voltage of the generator, and $r$ is the resistance of the circuit through the movable coil 20 and the resistance 21. Substituting $\frac{E}{r}$ for $I_m$ in (4)

$$\delta \propto \frac{EI \cos \theta}{r} \quad (6)$$

Since the power consumed in the circuit through the coil 20 and resistance 21 is negligible compared to that of the load, $EI \cos \theta$ is practically the total output of the generator.

The U-tube 15 and the resistance 21 are so constructed that the resistance $r$ of the circuit through the movable coil 20 is practically proportional to the rate of flow Q of steam in the pipe 13; that is $$r \propto Q \quad (7)$$

hence $$\delta \propto \frac{EI \cos \theta}{Q} \quad (8)$$

It is thus seen that the meter gives a deflection proportional to the power output divided by the rate of flow of steam. The scale of the meter may be marked to indicate kilowatt-hours per pound of steam or the reciprocal, pounds of steam per kilowatt-hour.

In the drawing there is shown a two-wire generator such as might be used for direct current or single-phase alternating current power. It will be understood, however, that the meter is not restricted in its application to two-wire machines, but may be used on polyphase alternators as well. With a polyphase generator if the load is unbalanced it would be necessary to have the number of dynamometers and resistances one less than the number of wires leading from the machine. If the load is balanced, one electro-dynamometer and one resistance will be sufficient.

The electro-dynamometer may be in the form of an ordinary watt meter having the current coils connected in series with the load and the pressure coil arranged in parallel with the load, and in series with the resistance 21. The instrument will, of course, be calibrated to read in the desired units, such as kilowatt-hours per pound of steam or the reciprocal, pounds of steam per kilowatt-hour.

I claim:—

1. The combination with a power unit, of an electrical instrument having two circuits for controlling the reading thereof, means for controlling the current in one of said circuits according to the power output of said unit, and means for varying the current in the other of said circuits inversely as the power supplied to said unit.

2. The combination with a power unit, of an electrical instrument for indicating the ratio of power output and power input of said unit, said instrument having a pair of electrical circuits, means for causing the current in one of said circuits to vary directly as the power by which it is controlled, and means for causing the current in the other of said circuits to vary inversely as the power by which it is controlled.

3. The combination with an electric generator and a prime mover therefor, of an electrical instrument for indicating the ratio of power consumed by said prime mover to the power output of said generator, said instrument having two circuits for controlling the readings thereof, means for causing the current in one of said circuits to vary directly as one of the terms of said ratio, and means for causing the current in the other of said circuits to vary inversely as the other term of said ratio.

4. The combination with an electric generator and a prime mover therefor, of an electrical instrument for indicating the ratio of power input of said prime mover to the power output of said generator, said instrument having two circuits for controlling the reading thereof, one of said circuits being connected with the circuit of said generator so that the current therein varies directly with the load current and the other of said circuits being connected with a resistance, and means for causing said resistance to vary directly as the power supplied to said prime mover.

5. In combination, a fluid-actuated prime mover, an electric generator driven thereby, an electro-dynamometer having the current coil thereof connected with the load circuit of said generator and having the pressure coil thereof connected with a non-inductive variable resistance, and a flow meter controlled by the flow of motive fluid to said prime mover for varying said resistance.

In testimony whereof I have signed my name to this specification on this 25th day of January, A. D. 1922.

ERNEST H. FREEMAN.